Oct. 24, 1967  B. R. GARRETT  3,348,654
APPARATUS FOR UNSCRAMBLING CONTAINERS
Filed July 2, 1965  7 Sheets-Sheet 6

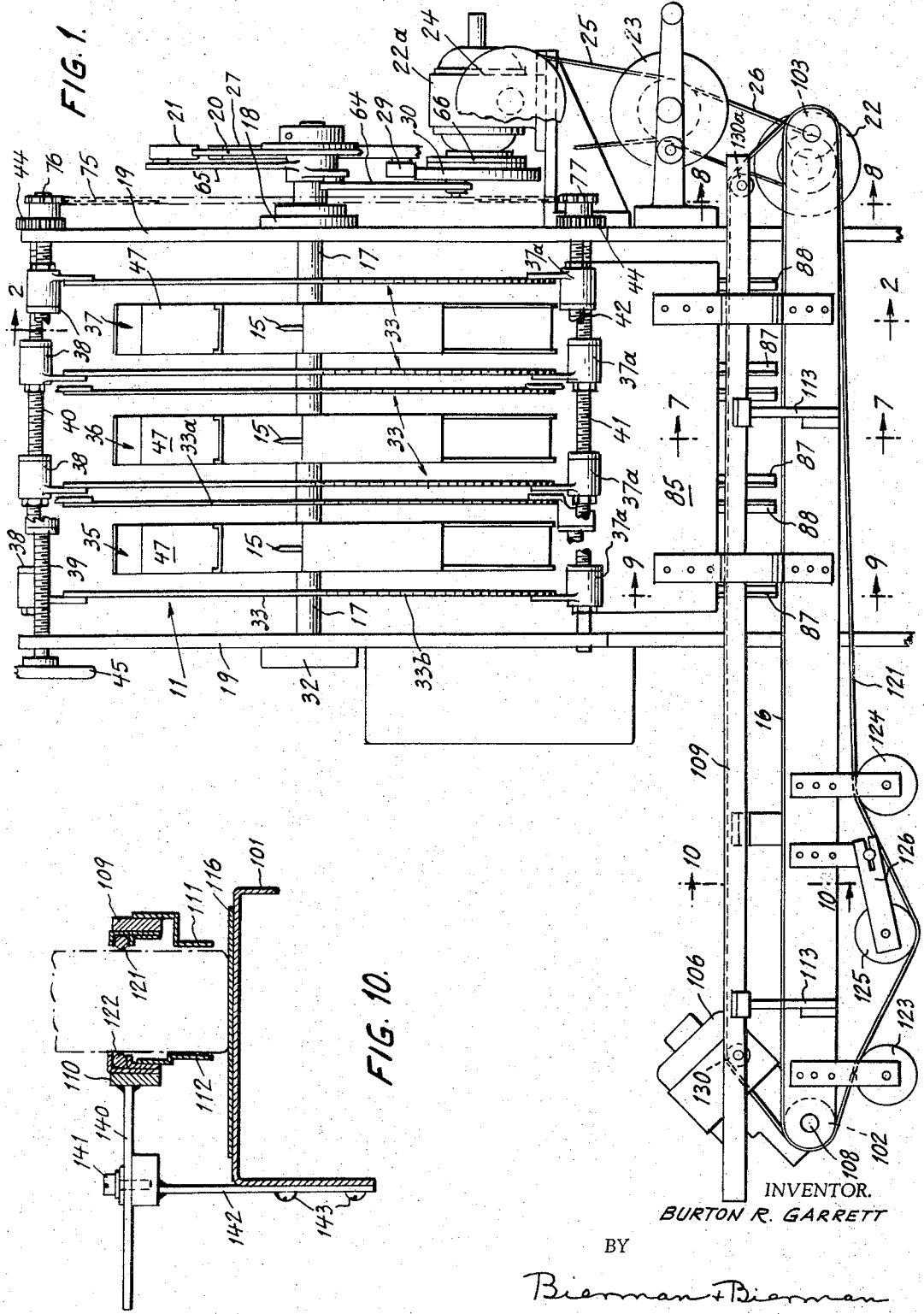

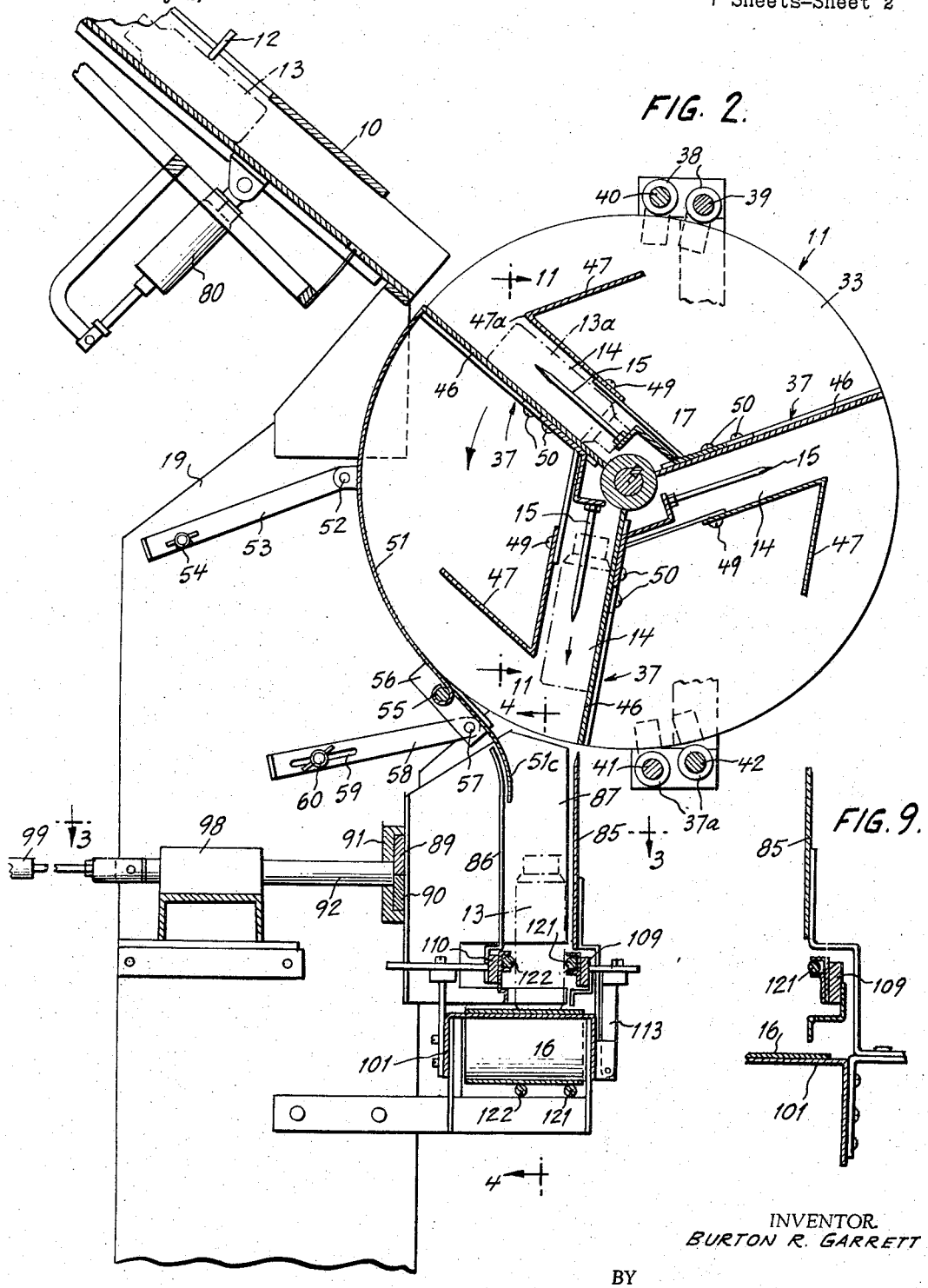

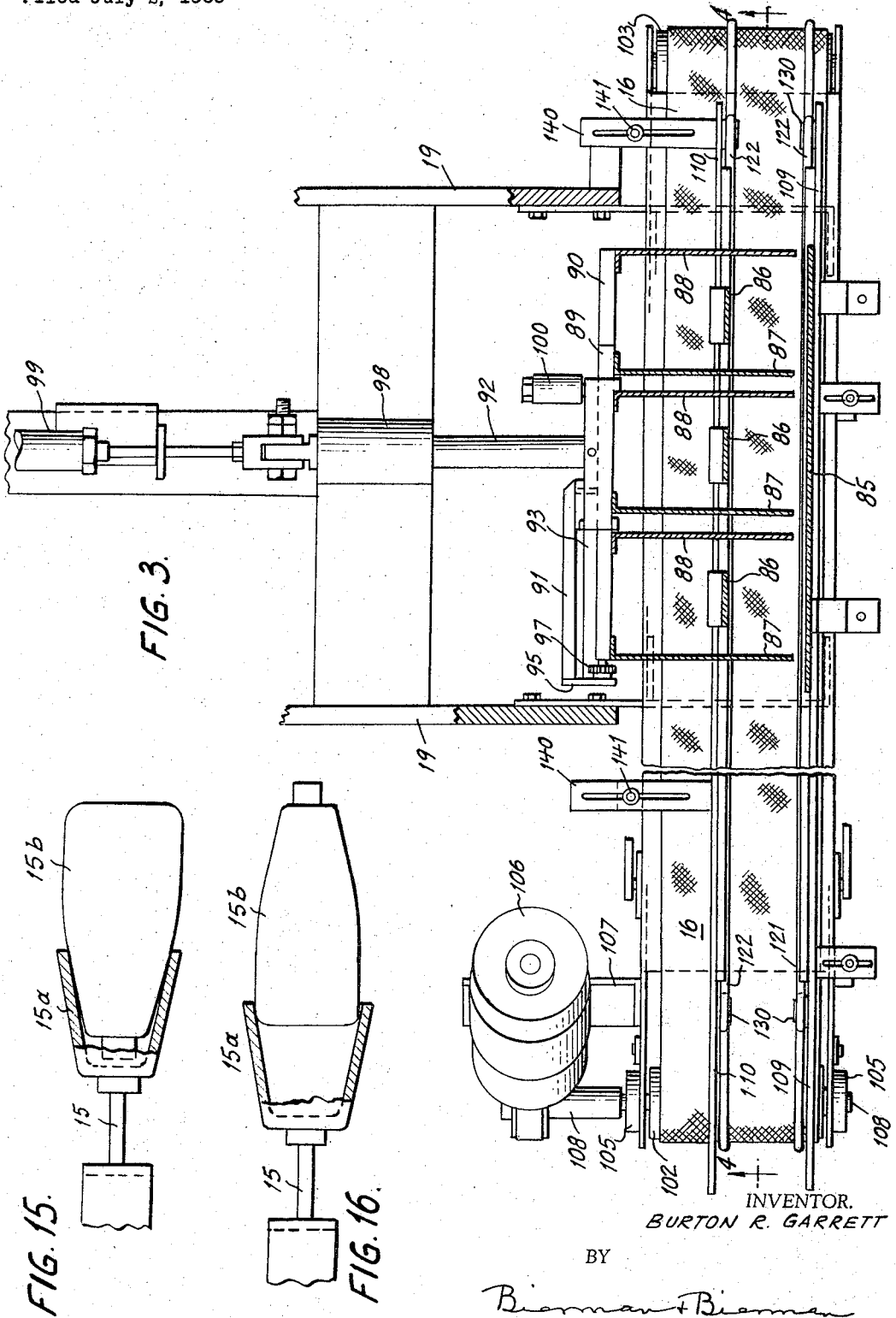

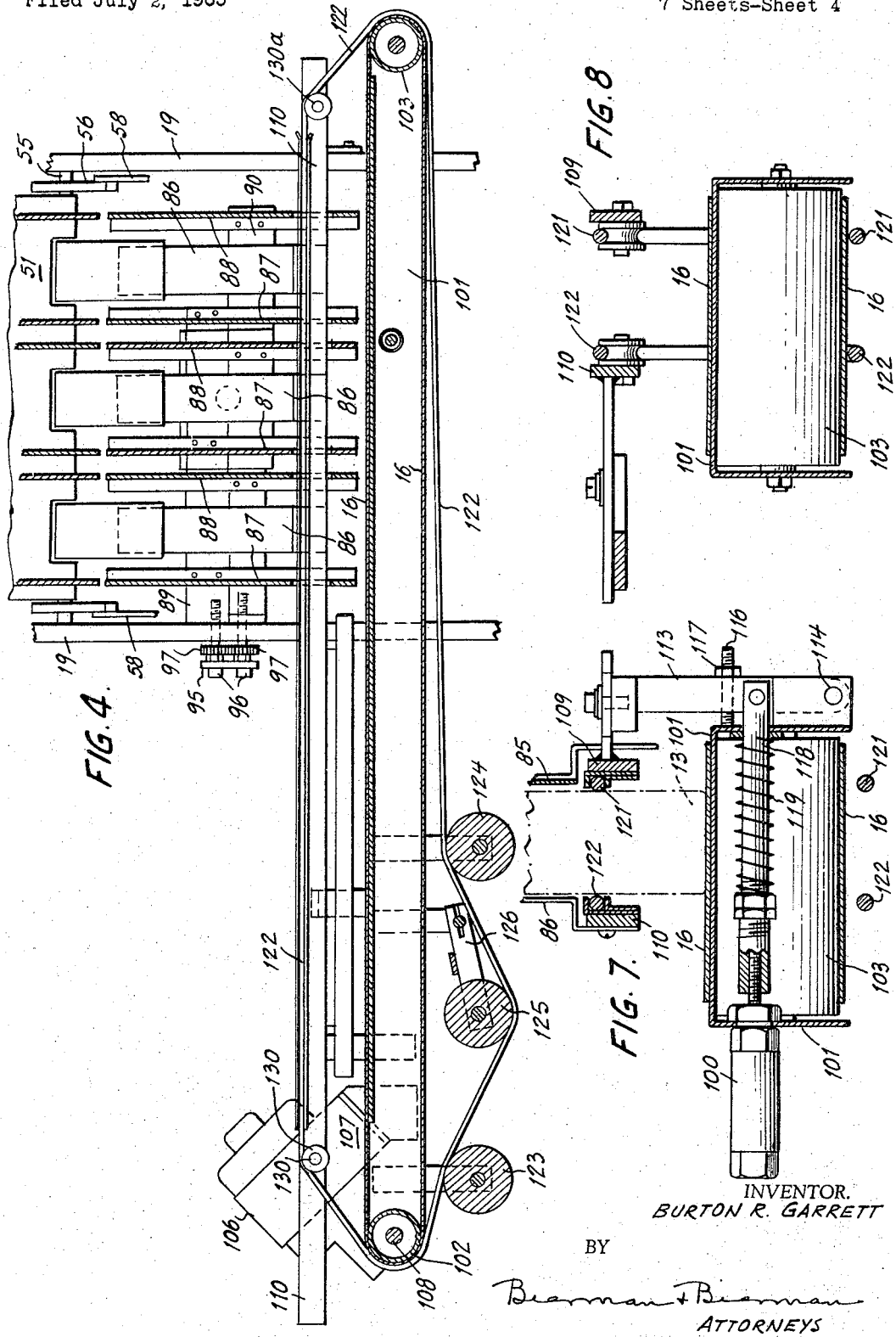

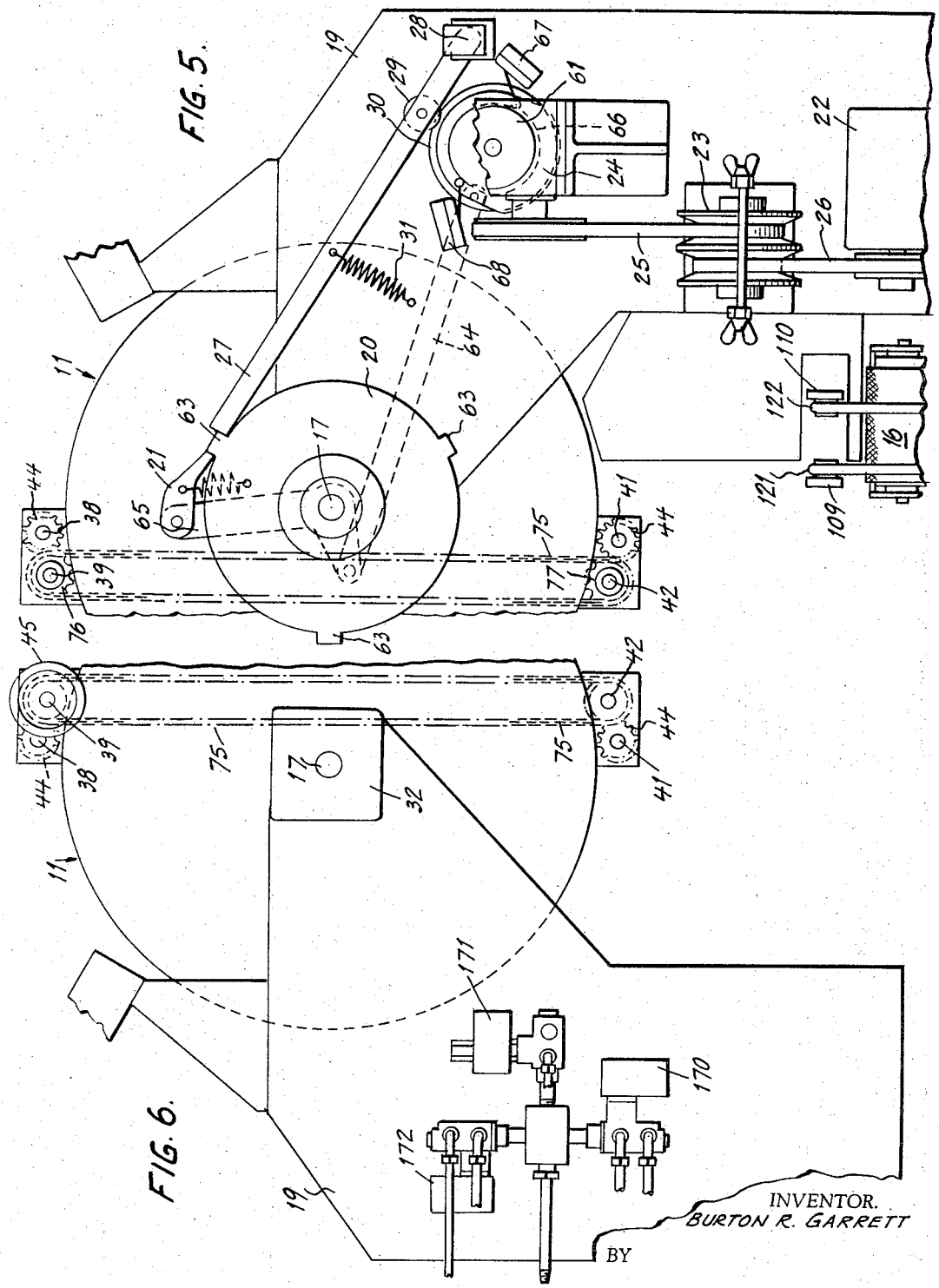

INVENTOR.
BURTON R. GARRETT
BY
Bierman + Bierman
ATTORNEYS

Oct. 24, 1967  B. R. GARRETT  3,348,654
APPARATUS FOR UNSCRAMBLING CONTAINERS
Filed July 2, 1965

INVENTOR.
BURTON R. GARRETT
BY
ATTORNEYS

United States Patent Office 3,348,654
Patented Oct. 24, 1967

3,348,654
APPARATUS FOR UNSCRAMBLING
CONTAINERS
Burton R. Garrett, 131—12 232nd St.,
Laurelton, N.Y. 11413
Filed July 2, 1965, Ser. No. 469,203
9 Claims. (Cl. 198—33)

This invention relates to an apparatus for handling or unscrambling plastic bottles, vials, metal and paper containers or other similar articles and has reference to means by which the bottles or other containers are picked up by conveying means from a hopper and are oriented if necessary, to enable them to be positioned upright on a conveyor by which they are transported to filling means, to packing devices or over to other mechanism.

It is an object of the invention to provide an apparatus of this character which will orient and feed bottles or other containers of various sizes; which will feed the containers rapidly and accurately and which will support the containers against tipping or toppling as they are moved along on the conveyor.

It is an object of the invention to provide an apparatus into which the containers may be fed either mouth foremost or bottom end foremost and in the case of those which are fed bottom foremost, will orient them to an upright position and with their mouths directed upwardly, and deliver them to the conveying means in such upright position.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is an elevational view, with parts in section, of a bottle unscrambler or uprighting device, constructed in accordance with the invention;

FIG. 2 is a vertical sectional view, taken substantially on the line 2—2 of FIG. 1, looking in the direction of the arrows;

FIG. 3 is a horizontal sectional view, taken substantially on the line 3—3 of FIG. 2, looking in the direction of the arrows;

FIG. 4 is a sectional view, taken substantially on the line 4—4 of FIG. 3, looking in the direction of the arrows;

FIG. 5 is a side elevational view of the part of the machine provided with the means for intermittently operating the bottle carrier;

FIG. 6 shows the opposite side of the machine with the solenoid valves;

FIG. 7 is a sectional view, taken substantially on the line 7—7 of FIG. 1, looking in the direction of the arrows;

FIG. 8 is a sectional view, taken substantially on the line 8—8 of FIG. 1, looking in the direction of the arrows;

FIG. 9 is a sectional view, taken substantially on the line 9—9 of FIG. 1, looking in the direction of the arrows;

FIG. 10 is a sectional view, taken substantially on the line 10—10 of FIG. 1, looking in the direction of the arrows;

Figure 12:
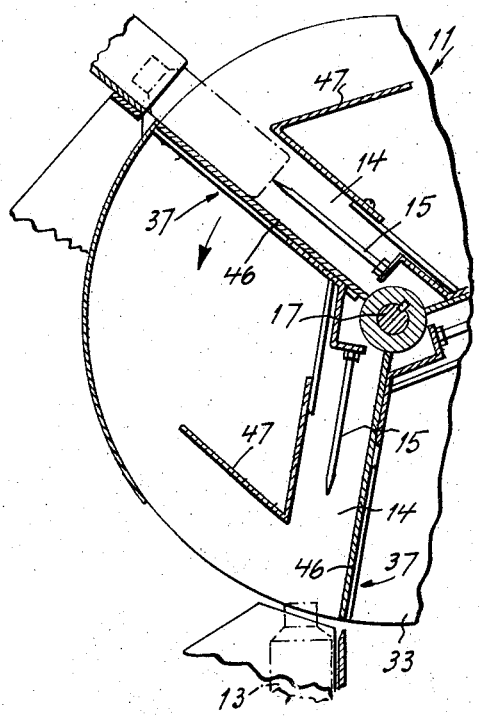
FIGS. 12 and 13 are sectional views respectively showing the action of the bottle-uprighting means.
Figure 11:
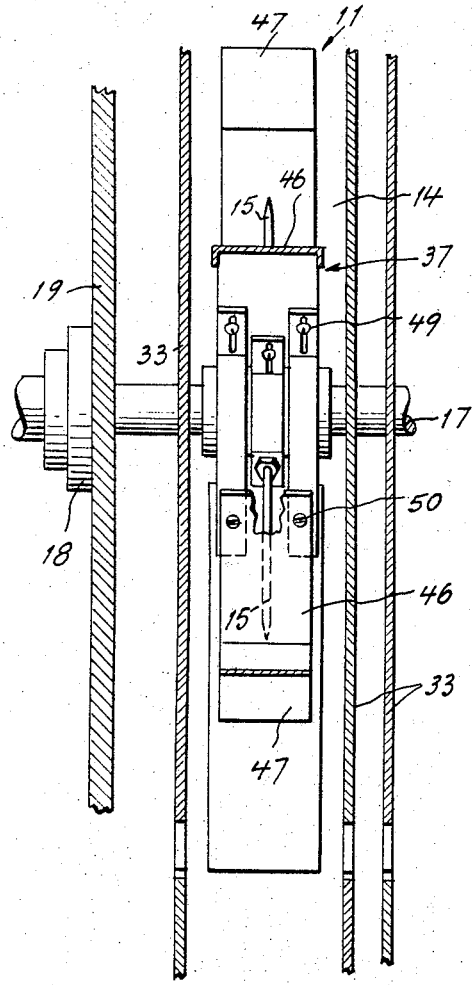
FIG. 11 is a sectional view, taken substantially on the line 11—11, looking in the direction of the arrows.

Described briefly, the apparatus includes a cleated endless conveyor, not shown in the drawings, but which is moved through a storage hopper containing the bottles or other containers which are haphazardly placed in the hopper. The conveyor picks up the bottles from the hopper with the bottles disposed axially of the direction of movement of the conveyor, but not always with the mouth end of the bottles arranged forwardly. The bottles carried by the conveyor are transported upwardly from the hopper to a point where they are discharged onto orienting and feed tracks. At this location, the bottles are lined up end to end in several rows. At the end of the track, the leading bottles are released to an orienting drum or rotary carrier where they are completely oriented to position them mouth upwardly by mechanical means and they are then deposited onto a conveyor on which they are held by side belts which maintain them steady and vertical and prevent them from toppling.

The bottles 13 which are picked up by a conveyor from the hopper not shown, are elevated to a position where they are discharged into a track 10 from which they are successively and intermittently delivered into a rotor 11 constituting a carrier and turning device for the bottles. The rotor or carrier construction is clearly disclosed in FIGS. 2, 11, 12 and 13.

The track 10 from which the bottles are succesively fed has, in the embodiment shown, three side-by-side bottle channels and it includes an escapement device 12 operative to release the bottles one at a time in each channel, and when each bottle 13 is released, it will slide down the track 10 and enter into one of the recesses or pockets 14 provided in the rotary carrier generally indicated at 11. The movements of the escapement 12 are controlled by a pneumatic cylinder 80 and a solenoid valve 172 (FIG. 6) and are synchronized with the movements of the carrier 11 so that as each bottle is released by the escapement one of the pockets 14 of the carrier will be aligned with the track 10 as shown in FIG. 2 and in position to receive the bottle therein indicated at 13a.

If the open or mouth end of the bottle entering the pocket 14 is foremost, a pin 15 fixedly mounted in each pocket and extending axially therein, will enter into the bottle as shown in FIG. 2, and as the carrier 11 is rotated counter-clockwisely as indicated by the arrow in FIG. 2, the bottle will slide down out of its pocket 14 to land upright on a conveyor belt 16 located below the carrier 11, to be carried away by the conveyor belt.

The carrier and bottle-turning device 11 is mounted on an intermittently-rotated shaft 17 in bearings 18 attached to the side frames 19 of the machine. On one end of the shaft 17, shown at the right in FIG. 1, is a three toothed ratchet 20 driven by a pawl 21 and eccentric drive. The driving means consists of a motor 22, a variable speed control 23, a gear box 22a, and V-belts 25 and 26. The gear box 22a is caused to rotate continuously by its drive from the motor 22 through the pulley 24. This causes the pawl 21, clearly shown in FIG. 5, to index the ratchet 20, 120 degrees for each revolution of the output shaft of the gear box. At 27 is shown a stop arm which accurately locates the end of the stroke and prevents over-travel of the ratchet. The stop arm is pivotally mounted at 28 on frame member 19 and is provided with a cam roller 29 for engagement with a cam 30 and held in contact therewith by the spring 31.

A brake is indicated at 32 and it helps to dampen the inertia of the assembly so that the assembly comes to a stop without undue shock.

The rotor or rotary carrier 11 includes fixed but adjustable disks 33 acting as separators or partitions between which are located three spiders indicated respectively at 35, 36 and 37. These spiders define three side-by-side radially-extending bottle-receiving pockets 14 as will be clearly seen in FIG. 2. Located axially of each of the pockets 14 is the pin 15. The pockets 14 are each formed of sheet metal elements that confine each bottle as the same enters the pocket 14. The disks 33 constitute fixed retaining walls and act to confine the bottles between them in the pockets.

Mounted on each of the disks 33 at approximately 180 degrees apart are two hubs, shown respectively at 37a and 38. These hubs hold nuts which engage with adjusting screws 39, 40, 41 and 42. The two right hand adjusting screws 39 and 40 are located at the tops of the disks, and these two screws are connected by spur gears 44, so that when one of the shafts 39 or 40 is rotated clockwise, its companion shaft will be rotated counterclockwise. Thus, when the disk 33a is caused to be moved to the left as viewed in FIG. 1, the disk indicated at 33b will be moved to the right. In this way, the several disks 33 will always remain equidistant from the spider positioned between them. This adjusting arrangement is duplicated at the bottom of the rotary carrier 11 as will be clearly seen in FIG. 1. A handwheel 45 is provided on the shaft 39 for rotating said shaft and securing the adjustment above described. A chain 75 extends between a sprocket 76 on the shaft 39 and a similar sprocket 77 on the shaft 42.

Each of the pockets 14 is provided with an adjustable guide plate 46 forming a bottle-supporting shelf that projects forwardly from the free end of the pin 15 to support a bottle that enters the pocket 14 bottom foremost as is shown in FIG. 12. The opposite side of the pocket 14 has an angular deflecting plate or baffle 47. The plates 46 and 47 are adjustable for various bottle sizes by means of the screws 49 and 50. The screws 49 permit the radial adjustment of the plate 47 and the screws 50 permit the adjustment of the assembly which carries plate 47 in order to accommodate bottles of various diameters. The function of each of the angular-ended deflecting or baffle plates 47 is to confine the bottle as it is rotated from its receiving position shown in FIG. 12 to discharge position toward which the bottle is shown being moved in FIG. 13.

Provided at 51 is an arcuate retaining and deflecting plate which is hinged at 52 to a bar 53 having a notch fitted over a bolt 54 secured in one of the frame members 19. The plate 51 is pivoted at 55 in a bracket 56 pivotally attached at 57 to a bar 58 fixed to the side frame 19 and having a slot 59 engaging a bolt 60 mounted in the frame member 19. The lower part of the plate 51 is pivoted at 55 on bar 58. This lower part 51c can be pivoted so that it can be adjusted with plate 86 to provide for a continuous path for the bottle as it drops onto the conveyor belt. The plate 51 and its part 51c are thus mounted by an arrangement that is such that should one of the bottles become wedged or jammed for any reason, the plate 51 can be swung away to allow access to the area in which the jammed bottle is located.

Figure 13:
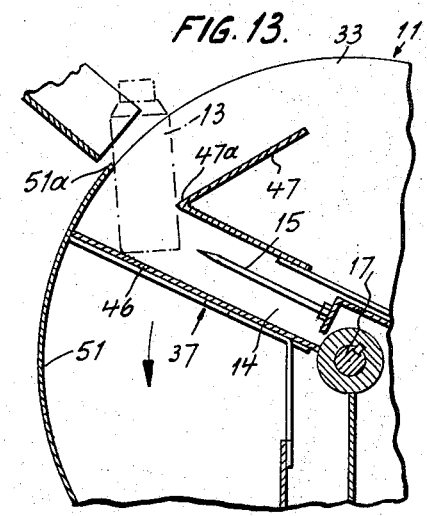

The pins 15 are so located that as a bottle enters each pocket 14 the pin 15 therein will enter into the mouth of the bottle, provided that the mouth of the bottle is at the time directed toward the free end of the pin as shown by the bottle 13a in FIG. 1. If the bottle has its bottom or closed end directed toward the pin 15 as in FIG. 12, the pin will then contact the bottom of the bottle and the bottle will rest on the forward or projecting part of the plate or shelf 46, and as the carrier 11 is rotated counter-clockwise as indicated by the arrow in FIG. 13, the bottle, contacting the upper end of the deflector plate 51 and confined between said end of the plate and the angular part of the plate 47, will be oriented to bring its mouth upwardly as shown in FIG. 13 and will be carried in such position to be deposited uprightly on the conveyor belt 16. The pins 15 may be made adjustable as to position and as to effective length to arrange for the handling of bottles of different sizes.

The driving and timing arrangement for the apparatus is shown in FIGS. 1 and 5. The gear box 22a is driven by the motor 22 through the speed reducer 23. Mounted on the output shaft of the gear box is an overload clutch. Mounted on the clutch is a dive plate 62 which serves as a cam for the cam roller 29 for the arm 27, which as previously described, rests on the ratchet 20 for engagement with one or the other of the three lugs 63 thereon. When the end of the arm 27 contacts one of the lugs 63, one or the other of the bottle-receiving pockets 14 will be positioned at the slide 10 in bottle-receiving position as shown at the upper left in FIG. 2.

The pawl 21 is indexed by means of a link 64 which is pivoted at one end to the arm of a bell crank 65 rockable on the shaft 17. For each revolution of the output shaft of the gear box, the carrier 11 indexes 120 degrees. The cam 62 causes the arm 27 to rise and release the ratchet 20 just before the ratchet is engaged by the pawl 21. It again drops down before the end of the stroke.

Also mounted on the clutch 61 is a cam plate 66 which actuates a limit switch 67. Another cam plate is also provided on the clutch for the actuation of a limit switch 68, and these two switches control the three cylinders which control the track escapement, the bottle release escapement and the belt release on the conveyor escapement and the belt release on the conveyor 16. The cylinder for the bottle track escapement is that shown at 80 in FIG. 2; the cylinder for the bottle release escapement is shown at 99, and the cylinder for the belt release is shown at 100. Since the timing arrangement and the rotary carrier drive are all mounted on the slip clutch, synchronism is always maintained, even thought a bottle or other object should jam in the rotary carrier and cause clutch slippage.

As each bottle or other container drops from the rotary carrier 11, it is confined in a box-like compartment consisting of a front plate 85, which may be composed of a transparent material such as Lucite; a back plate 86 and two side plates on the bottle release assembly, said plates being indicated at 87 and 88 in FIG. 3. Similar plates are provided for each of the three chutes of the rotary carrier 11. The three plates indicated at 87 are all attached to an upper slide bar 89. The three remaining plates indicated at 88 are attached to a lower slide bar 90. These two slide bars 89 and 90, shown in FIGS. 2 and 3, are maintained in slidable relation by means of a plate 91 attached to a rod 92, plates 93, one top and one bottom, and two straps. Onto the back of the plate 91 is attached a bracket 95 and the bracket is provided with two holes through which pass screws 96 (FIG. 4). On these screws are pinned mating gears 97. The uppermost of the screws engages plate 89 and the bottom screw engages plate 90. Thus, when the top screw is turned clockwise, the top plate 89 will be drawn to the left and the bottom plate 90 moved to the right through the action of the gears 97. The slide plates 89 and 90 respectively carrying the partition plates 87 and 88 maintain the partition plates symmetrical with the center lines of each bottle chute. The mounting and adjusting means for the partition plates 87 and 88 is mounted on the rod 92 carried in block 98 in suitable bushings, and is actuated by an air cylinder shown at 99. The air cylinder 99 is actuated by a solenoid type air valve 170 (FIG. 6) and causes the partition plate assembly, carrying the several plates 87 and 88, to be moved either forwardly or backwardly.

When the bottles have landed upright, or with their mouths disposed upwardly, the rod 92 is actuated to draw the partition plates 87 and 88 away from the conveyor belt 16 over which they are normally positioned, thus allowing the bottles to be carried along by the conveyor belt. As the partitions are thus withdrawn by their movement transverse to the conveyor belt, another cylinder indicated at 100 in FIG. 7 and controlled by a solenoid valve 171 (FIG. 6) becomes effective to cause side belts 121 and 122 at the conveyor 16 to grip the bottles on the conveyor so that they do not topple while being carried by the conveyor.

The conveyor 16 is an endless belt and is provided with a substantially U-shaped frame member 101. At ends of the frame are rollers 102 and 103 mounted in suitable bearings. The roller 103 forming a belt drum is rotative on a stationary shaft. The roller 102 constituting a second belt drum, is keyed on a rotative shaft 108 which rotates in bearings 105. A geared motor 106 is mounted in a bracket 107 and it drives the shaft 108.

Two adjustable side guides 109 and 110, by means of associated elements and feed belting, support and guide the bottles as they are released by the bottle release assembly and are carried along on the conveyor. The front guide, or that shown at 109 is normally fixed in position approximately in line with the front plate 85. The rear guide, or that shown at 110, is adjustable to compensate for diameter or thickness of the bottles being handled. Said rear guide has, for the purpose of adjustment, slotted bars 140 extending rearwardly from it, said bars being held by screws 141 in the required position, which screws enter posts 142 secured by screws 143 to the conveyor frame. A bottom side guard shown at 111 in FIG. 10, attached to the guide 109 extends for the full length of the conveyor and supports the bottles, preventing them from toppling sidewise. Attached to the adjustable side guide 110 is a similar lower guide 112 which picks up the bottles after they leave the bottle release partitions and supports them to almost the end of the conveyor 16.

The front side guide 109 is mounted on arms 113 (FIG. 7) which pivot on screws 114 attached to blocks 115. A stop formed by a set screw 116 and nut 117 thereon, limits the forward movement of the assembly. A rod 118 is pivotally attached to the arm 113. At the opposite end of the rod 118 is an opening which receives the piston rod of the air cylinder 100. When the piston of the cylinder 100 is actuated, its rod moves forwardly, causing bar 113 to swing on its pivot 114 away from the conveyor 16. When the air is released from the cylinder 100, the spring 119, encircling the rod 118, returns the bar 113 and the guide 109 to its normal position.

When the bar 113 is pivoted outwardly and in the direction away from the conveyor, the conveyor is then in a position to receive a bottle. When the bottle is in position to be released and it is released down the conveyor, the air is then exhausted from the air cylinder 100, allowing the belt 121 to engage the outer side of the bottle to support the bottle as it is moved along on the conveyor toward the left as viewed in FIG. 4.

The bottles are supported along their opposite sides by a belt 122 (FIG. 7) and the two belts 121 and 122 pass around the front roller 102 of the conveyor and over idler rolls 123 and 124 (FIG. 4) and over take-up roll 125. The latter roll 125 is carried by arms 126 supported from the conveyor frame. Since the belts 121 and 122, after passing over pulley 130, then engage the drive roll 102, the belts 121 and 122 which pass over a similar roll 130 at their opposite ends, are resultantly driven at substantially the same speed as that of the conveyor belt 16. This helps to keep the bottles in the same upright position when they are suddenly released from the carrier.

Figure 14:
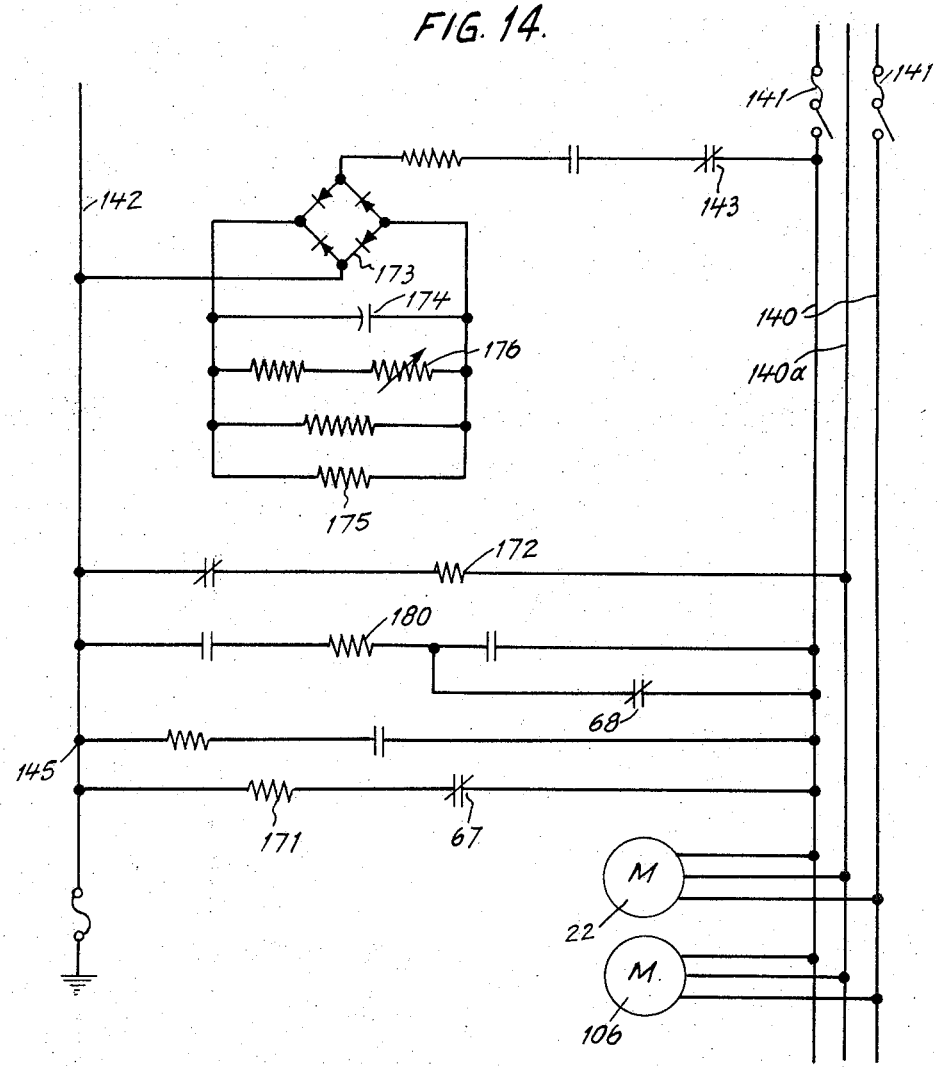
FIG. 14 is a diagram showing the electrical circuit for the apparatus, and FIGS. 15 and 16 respectively show means by which receptacles or other oblong objects which are tapered at one end are engaged by a cup or nest on the carrier to be brought to the desired upright position on the conveyor.

The wiring diagram for the apparatus is shown in FIG. 14. The conveyor motor is indicated at 106 and the orienter and carrier drive motor 22 are both shown as connected to the power line 140 and across the starting switch 141. A grounded line 142 is provided so as to obtain a 110 volt control circuit, the main current being 220 volts, 60 cycle 3 phase.

The two limit switches are designated respectively at 67 and 68. The limit switch 67 actuates both the conveyor bottle release and the conveyor belt release. The conveyor bottle release is connected across the normally open contacts 145. Therefore when the limit switch 67 is actuated and the contacts are closed, the mechanism is in a position to prevent the bottles from moving down the conveyor. When the contact is open, the side plate or partition assembly is moved backwards away from the conveyor 16, allowing the bottles to be carried along the conveyor.

The conveyor belt release valve 171 is connected across the normally closed contact of the limit switch 67. In this condition the cylinder 100 is actuated in a manner to hold the side belt 121 away from the bottle. When the limit switch 67 is actuated, the bottle release is withdrawn, the side plate assembly or bottle release is withdrawn, the normally closed contact of the limit switch being opened, deenergizing the coil of the solenoid valve 171. This causes the side belt 121 to be moved inwardly to engage the sides of the bottles as they are carried along by the conveyor 16. The track escapement 12 is actuated through the limit switch 68.

In the described electrical circuit a number of safeguards are provided. It is necessary to prevent the escapement from starting or stopping in the middle of a cycle. Thus, if power to the orienting device should be turned off while the track escapement 12 is in the middle of its cycle, it would release again when the machine is started up, depositing two sets of bottles into the same orienting section, causing the machine to jam when the carrier shaft revolved. The circuit therefore provides that the track escapement 12 will complete its cycle even though the power is turned off in the middle of the cycle. It also provides that the track engagement will not actuate if the machine is started up when the cam is actuating the limit switch. The circuit also provides for an external connection that will allow the escapement to stop any time that an external switch is open. This is used for a level control on the receiving conveyor.

The track escapement cylinder 80 is actuated by the valve shown at 172 which is in turn actuated by the contact of a relay 175 which is in turn having its coil across the DC supply 173 and is actually powered by the discharge of the 50 microfarad capacitor 174. The length of time that the capacitor will actuate the coil of the relay 175 is controlled by the variable resistance 176. Since the capacitor will store power and hold it for a period of time even after the power is shut off, the actuation of the relay 175 will not be interrupted when the power is shut off. Since line 142 and line 140a are not broken by the cut-off switch, power is always available to relay 175 and valve 172.

When power is turned on and the conveyor level control contact is closed, the coil of the relay 180 is energized causing its contacts to close. The current then bypasses the normally closed contact of limit switch 68 and relay 180 remains energized as long as the conveyor level control switch is closed and the main power supply is not turned off. Another contact of relay 180 is in series with the normally open contact of limit switch 68. Therefore each time that the limit switch 68 is actuated and its normally open contact is closed, a surge of current passes through the rectifier 173 and actuates the coil of relay 180 causing its contact to close and actuate the valve 172 which in turn actuates the track escapement. Since the limit switch 68 is actuated only momentarily, just long enough to charge the capacitor, the length of time that the track escapement is actuated is controlled entirely by the electrical circuit.

Should the power be turned off while the limit switch 68 is being actuated, the relay 180 will drop out and the normally closed contact of limit switch 68 will be open so that the relay cannot pull in again. However, enough power will have been stored in the capacitor to complete the cycle. When power is again restored, the normally closed contact of the limit switch 68 will be open and the escapement will not actuate until, as the cycle continues around, limit switch 68 will close again and the track escapement will be actuated on the next cycle.

From the foregoing, the operation of the improved bottle-handling apparatus will be apparent. The bottles or other containers are deposited haphazardly in a container or hopper and are picked up therefrom by an endless, cleated conveyor or elevator not shown, but which carries the bottles upwardly and deposits them in the tracks 10. Three of these tracks are arranged in side-by-side relation, but more or less of the tracks can be employed according to the number of rotary bottle carriers used.

The bottles or other receptacles that are carried by the conveyor are deposited endwisely in the tracks 10 and some of the bottles are so deposited in the tracks that they have their mouths foremost or in the direction of their movement along the tracks. Other bottles deposited in the tracks 10 are moved bottom foremost. The bottles which are directed with the bottom foremost require uprighting or orientation before they are deposited on the conveyor belt 16.

This required orientation for these particular bottles is clearly disclosed in FIGS. 12 and 13. It will be seen in FIG. 12 how a bottle, entering the pocket 14 of the rotary carrier 11, has its bottom brought into contact with the pin 15, thereby limiting the advance of the bottle into the pocket and retaining it out of the pocket to a substantial extent and supported on the forward part of the plate 46. When the carrier starts its rotation in the direction of the arrow in FIG. 12, and while the bottle is positioned as above described, the bottle is brought into contact with the upper end 51a of the deflector plate 51 and starts to tilt toward a vertical position and with its mouth directed upwardly as clearly shown in FIG. 13. During this orienting movement the bottle is confined between the part 51a of the deflector plate 51 and the angular plate 47. As the bottle assumes a substantially upright position with its mouth uppermost, or is slightly inclined against the angular plate 47, it is carried downwardly by the carrier 11 to reach and be deposited upon the conveyor belt 16.

The bottles which reach the carrier 11 with their mouths directed toward the carrier, such as is shown at 13a in FIG. 2, enter the pockets 14 and the pin enters into the bottle, allowing the bottle to fully enter the pocket 14. As the carrier rotates, such bottle will be swung downwardly and will enter between the plates 85 and 86 and come to rest upon the conveyor belt 16. It will be clear from the foregoing, that regardless of the manner in which the bottles or other containers are presented to the carrier 11, the same will eventually be deposited upright or with their mouths directed upwardly, on the conveyor belt 16.

As the bottles are being deposited on the conveyor belt 16 they are held uprightly and prevented from toppling by being confined by the partitions 87, 88, which are at the time located forwardly and over the conveyor belt 16, and which partitions co-operate with the plates 85 and 86 in holding the bottles erect. At this time, the guide belt 121 is held away from the bottles. As the partitions 87, 88 are withdrawn by movement transversely of the conveyor belt, the belt 121 is then moved inwardly against the bottles, so that the bottles now resting on the conveyor belt 16 are supported at the sides by the belts 121 and 122, substantially as shown in FIG. 10, while they are being carried along on the conveyor belt, to one end of the same where they are removed or transferred to other mechanism for subsequent handling.

While I have herein disclosed the pin 15 as entering into a bottle through the mouth of the same when the bottle is presented mouth-foremost to the carrier, it will be apparent that the disclosed apparatus can be used for many objects having, for example, a tapered shape at one end. This is shown in FIGS. 15 and 16 wherein the pin 15 is provided at its free end with an attached frusto-conical cup or nest which can receive either the smaller neck end of a bottle or other object 15b as in FIG. 15 or as shown in FIG. 16 should it be desired so that the opposite end of the bottle 15b be received.

It will also be apparent that numerous modifications might be made in the described structure without departing from the spirit of the invention. The rotative carrier is shown, for example, with three channels or chutes, but it will be obvious that the number of these channels can be varied. Also while the apparatus is described for use in handling bottles or other containers of various shapes and sizes, other oblong objects may also be handled in the manner herein described.

What is claimed is:

1. An apparatus for uprighting bottles or articles having their opposite ends of different shapes or contours comprising, a slide on which bottles are delivered, a rotative carrier having pockets into which the bottles are delivered from the slide, each pocket containing an axially positioned pin for entry into a bottle or for contact with the bottom of a bottle according to the way in which a bottle enters a pocket, each pocket also including an angular deflecting plate fixedly carried by the pocket, a bottle conveyor, a delivery channel through which each bottle is carried on its way to the conveyor, said channel including a deflector plate defining an arcuate wall of said delivery channel, said plate having a part for contact with a bottle confined between it and the deflecting plate on the pocket to orient the bottle to a position with its mouth disposed upwardly so that it reaches the conveyor and assumes an upright position thereon when it leaves the carrier.

2. In an apparatus for handling bottles and similar containers, an endless conveyor, a rotary bottle carrier operative above the conveyor and having its direction of rotation substantially at right angles to the direction of travel of the conveyor, means for continuously moving the conveyor, means for intermittently rotating the bottle carrier, means operative to orient bottles presented to the carrier so that each bottle deposited on the conveyor from the carrier will be disposed with its mouth uppermost, a partitioned unit for disposition over the conveyor and between the carrier and the conveyor to hold the bottles from toppling when they are deposited from the carrier to the conveyor, means for moving said partitioned unit away from the conveyor after the bottles are deposited on the conveyor so that such bottles can be carried away by the conveyor, bottle supporting belts operated at substantially the same rate of speed of travel as the conveyor and disposed at the opposite sides of the bottles deposited on the conveyor to thereby hold the bottles from toppling as they are moved along by the conveyor, one of said belts being movable toward and away from bottle-engaging position whereby said belt may be located away from such position during loading of the conveyor with bottles and brought into bottle-engaging position after the bottles are deposited on the conveyor.

3. In an apparatus for handling bottles or articles having their opposite ends of different shapes or contours that are closed at one end and have mouth openings at the opposite end, a slide upon which the bottles are movable either with their mouths or their bottoms foremost, a rotative carrier for receiving bottles from the slide, said carrier having a plurality of radial bottle-receiving pockets into which the bottles enter, each pocket containing a pin disposed axially of the pocket and terminating rearwardly of the forward end of the pocket, each pocket including a shelf portion extending forwardly of the pin, means for rotating the carrier and halting it to successively position each shelf portion in alignment with the slide so that bottles are slid from the slide onto the shelves and the bottles which have their mouths foremost are caused to fit over the pin, and means for orienting bottles that have their bottoms presented foremost to thereby upright such bottles on the shelves and cause such bottles to be discharged from the carrier in an upright position and with their mouths directed upwardly, and conveyor means for receiving the bottles in an upright position and carrying them in such position, 4. In an apparatus according to claim 3 and including a continuously moving conveyor on which the bottles are deposited by the carrier, means operative to and from the conveyor to hold the bottles upright and temporarily stationary during their deposit on the conveyor, and means movable along with the conveyor for engaging with opposite sides of the bottles and holding them from toppling while they are being transported by the conveyor.

5. An apparatus for uprighting bottles and articles having their opposite ends of different shapes or contours comprising, a slide having a plurality of tracks in which bottles are moved in rows to a rotary carrier, said carrier being provided with a plurality of rows of radial pockets into which the bottles enter from the slide, a pin disposed in each pocket, said pin being adapted to enter a bottle as the bottle enters a pocket with its mouth foremost, said pin being adapted to contact with the bottom of a bottle when such bottle enters the pocket with its bottom foremost, guide means for the rows of bottles as the same are carried by the carrier, said guide means including an abutment in the form of one end of an arcuate plate for contacting the bottles whose bottoms are contacted by the pins, said abutment being effective to upturn said bottles to bring their mouths uppermost as said bottles are carried by the carrier past said guide means, and means on each pocket for cooperating with the abutment for attaining the upright position for each uprighted bottle.

6. An apparatus for handling bottles and articles having their opposite ends of different shapes or contours comprising, a slide by which bottles are successively delivered, a rotary carrier having a plurality of bottle-receiving pockets into which bottles are delivered from the slide either mouth-foremost or bottom-foremost, the pockets being separated by adjustable partition disks, means for intermittently rotating the carrier with halts of its pockets at the discharge end of the slide to receive bottles in an upright position in its pockets from the slide, means for orienting any bottles to bring them to mouth-upward position on the carrier when such bottles are delivered from the slide to the carrier in a bottom-foremost position, a belt conveyor operative below the carrier and on which all of the bottles are delivered in an upright position, movable partitions operative between the carrier and the conveyor to position the bottles on the conveyor when delivered thereto by the carrier, means for withdrawing the partitions from over the conveyor to allow the bottles on the conveyor to be carried away by the conveyor, spaced movable guide belts above the conveyor for engaging the opposite sides of the bottles thereon to prevent toppling of the bottles, and means for moving one of the belts to position the same away from the bottles while the bottles are being delivered by the carrier to the conveyor.

7. An apparatus for uprighting bottles and other hollow objects having differently shaped ends comprising, a rotary carrier having radial pockets for receiving the objects from a supply source and to which carrier the objects are presented either mouth first or bottom first, means in each pocket for entering each object that is presented mouth first and holding said object from overturning while it is brought by the carrier to a support, with such means also effective to engage against the bottom of an object that is brought to the carrier bottom first, an abutment against which the latter object is brought by the carrier and which causes such object to be moved to a mouth upward position on the outside of one of the pockets but without causing the displacement of the object from off the carrier, an outlet chute to which all of the bottles or other objects are borne by the carrier and through which all of the objects pass mouth upward and are deposited mouth upward on the support.

8. In an apparatus for uprighting bottles and other hollow objects having opposite ends of different shape, a rotary carrier for receiving bottles positioned with either their bottoms or mouths presented foremost, a bottle outlet chute, means on the carrier entering those bottles that are presented mouth foremost and holding such bottles from overturning while they are borne by the carrier to the bottle outlet chute, means abutting the bottles that are presented bottom foremost and swiveling the latter bottles to an upright, mouth-upward position without displacing such swiveled bottles from the carrier, and means on the carrier for carrying all of the bottles through a similar arcuate path of travel to reach and enter the bottle outlet chute.

9. In an apparatus for holding bottles and other hollow objects, a carrier to which the bottles are delivered either mouth foremost or bottom foremost, an outlet chute to which all of the bottles are transported by the carrier through an arcuate path of travel to bring all of the bottles in to the chute in a like, uniform upright position with their mouths directed upwardly, means for holding the mouth-foremost bottles on the carrier in the position in which they were received thereon, and means for inverting the bottom foremost bottles to a mouth-upward position without displacing them from the carrier so that they are thereafter transported by the carrier to the outlet chute and are deposited therein mouth upwardly.

References Cited
UNITED STATES PATENTS

| 2,630,221 | 3/1953 | Stewart | 198—33 |
| 2,815,113 | 12/1957 | Henderson | 198—33 |
| 3,100,562 | 8/1963 | Whelan | 198—33 |
| 3,143,201 | 8/1964 | Wyle | 198—33 |
| 3,155,220 | 11/1964 | Thorp | 198—165 X |
| 3,166,177 | 1/1965 | Laverty | 198—33 |

EVON C. BLUNK, *Primary Examiner.*

EDWARD A. SROKA, *Examiner.*